United States Patent [19]
Yost et al.

[11] Patent Number: 5,987,329
[45] Date of Patent: Nov. 16, 1999

[54] SYSTEM AND METHOD FOR MOBILE TELEPHONE LOCATION MEASUREMENT USING A HYBRID TECHNIQUE

[75] Inventors: George P. Yost, DeSoto; Shankari Panchapakesan, Dallas, both of Tex.

[73] Assignee: Ericsson Inc, Research Triangle Park, N.C.

[21] Appl. No.: 08/902,970

[22] Filed: Jul. 30, 1997

[51] Int. Cl.⁶ .................................................. H04M 11/00
[52] U.S. Cl. .................... 455/456; 455/457; 342/450; 342/357
[58] Field of Search .................. 455/456, 457; 342/450–458, 357

[56] References Cited

U.S. PATENT DOCUMENTS

| | | | |
|---|---|---|---|
| 5,327,144 | 7/1994 | Stilp et al. | 342/387 |
| 5,512,908 | 4/1996 | Herrick | 342/387 |
| 5,526,357 | 6/1996 | Jandrell | 370/95.2 |
| 5,600,706 | 2/1997 | Dunn et al. | 379/59 |
| 5,666,647 | 9/1997 | Maine | 455/456 |
| 5,758,288 | 5/1998 | Dunn et al. | 455/456 |
| 5,774,802 | 6/1998 | Tell et al. | 455/408 |
| 5,812,522 | 9/1998 | Lee et al. | 370/206 |
| 5,883,598 | 3/1999 | Parl et al. | 342/457 |

FOREIGN PATENT DOCUMENTS

| | | |
|---|---|---|
| 0 767 594 A2 | 9/1996 | European Pat. Off. . |
| WO 96/35306 | 5/1996 | WIPO . |
| WO 97/23785 | 12/1996 | WIPO . |
| WO 98/01768 | 7/1997 | WIPO . |

OTHER PUBLICATIONS

Drane et al, Positioning GSM Telephones, XP–000752570, IEEE Communications Magazine, Apr. 1998, pp. 46–54.

*Primary Examiner*—David R. Hudspeth
*Assistant Examiner*—Vijay B. Chawan
*Attorney, Agent, or Firm*—Jenkens & Gilchrist

[57] ABSTRACT

A system and method for improving the accuracy of a location measurement within a telecommunications system is disclosed. A combination of Time Difference of Arrival (TDOA) and Timing Advance (TA) location measurement techniques enables Automatic Location Identification (ALI) with minor modifications to the telecommunications system, whereby the combination exhibits reduced measurement error and resolution of ambiguities present in either technique separately.

20 Claims, 8 Drawing Sheets

SYSTEM AND METHOD FOR MOBILE TELEPHONE LOCATION MEASUREMENT USING A HYBRID TECHNIQUE

BACKGROUND AND OBJECTS OF THE PRESENT INVENTION

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue in the coming decades as well, as this wireless network interacts with and eventually overtakes the existing wireline networks.

Pursuant to a recent Federal Communications Commission (FCC) Ruling and Order, cellular phone service providers within the United States must provide by October 2001 the capability to locate the position of a cellular phone making an emergency (911) call within the provider's system to within 125 meters with about 67% probability, i.e., within one standard statistical deviation. A variety of techniques are currently under study. All measure the cellular phone's position by reference to establish points whose positions are known. The phone's location is estimated to lie at the best intersections (n the least-squares or maximum likelihood sense, since all location measurements have random errors) of curves whose shapes and locations are determined by the particular technique utilized, as described in more detail hereinafter.

The Global Positioning System (GPS), which uses several satellites as reference points, generally provides the requisite high degree of accuracy in location measurements, well within the FCC's constraints. GPS systems, however, although providing accurate measurements under favorable conditions, do not function well inside buildings or other areas obscuring access to the orbiting satellites, e.g., "urban canyons" formed by multiple, adjacent high-rise buildings such as found in any large city. Furthermore, GPS is not compatible with existing cellular phones and the incorporation of GPS technology into a cell phone or other mobile terminal would require extensive hardware additions and modifications.

Another technique, signal strength measurements, establishes circular arcs around the base stations servicing the mobile terminals. This technique, however, is hampered by a poor understanding of path loss, and hence the errors are large. Angle of Arrival (AOA) measurements intersect radii from the base stations to pinpoint location. As few as two base stations suffice to determine an intersection unless the mobile terminal is near to the line between the base stations. This, however, requires expensive modifications to base station antennas, which are further complicated by neighborhood resistance to obtrusive antennas.

A technique known as Time Difference of Arrival (TDOA) requires that the base stations be synchronized with respect to each other. This may be done using inexpensive GPS receivers at the base stations, or by other techniques. In TDOA one measures the time differences between the arrivals of a given signal from the mobile terminal at three or more base stations. This does not require any timing information from the mobile phone itself. As will be discussed further herein, two base stations together will determine a hyperbola; the mobile terminal will lie upon one of the branches of the hyperbola. The sign of the TDOA determines the particular hyperbolic branch unless the TDOA is within errors of being zero. Three base stations will determine three hyperbolic curves, of which two contain independent information, and the mobile terminal will lie at the intersections of respective branches of those curves.

Another technique takes advantage of the Timing Advance (TA) which is used in all Time Division Multiple Access (TDMA) systems to determine the amount of timing the mobile terminal broadcast burst must be advanced in order to fit into the proper time slot. An advance is required if the mobile terminal is sufficiently distant from the base station that its burst would otherwise be significantly retarded due to the time of transit to the base station. TA depends on the distance from the serving base station and thus is a measure of the distance from that station. By using various techniques, the TAs from several base stations can be measured, forming a corresponding number of circles about the respective base stations, and the mobile terminal will lie at the intersection of the resultant circles. It should be understood that in this invention any technique under the general heading "Timing Advance" measures the time for a signal to travel from the mobile terminal to the base station, regardless of whether or not the measure is actually used in calculating timing advance.

Of the above techniques, Time Difference of Arrival (TDOA) and Timing Advance (TA) enable Automatic Location Identification (ALI) with the use of currently-available mobile terminals with relatively inexpensive modifications to the base station hardware and software. However, TDOA, although practical and under scrutiny in many quarters, is somewhat limited in precision and requires a minimum of three base stations to determine anything more than a single hyperbolic contour along which the target lies. TA, by itself, is even more limited in precision, although only two base stations are adequate to reduce the problem to a two-fold ambiguity within the horizontal plane, within errors, as will be discussed further herein.

In assignee's co-pending patent application, U.S. Ser. No. 08/839,864, entitled "Systems and Methods for Locating Remote Terminals in Radiocommunication Systems," a selective technique is disclosed whereby either TDOA or TA is used to determine the location of a mobile terminal. The co-pending patent application, however, does not disclose or suggest a hybrid technique combining both TDOA and TA into a synergistic system and method as described and set forth in the present application.

In any event, except for GPS, errors inherent within the aforedescribed location measurement approaches do not currently meet the FCC mandate.

It is, therefore, an object of the present invention to reduce the aforementioned inherent errors in measurement for the various techniques.

It is also an object of the present invention to meet the FCC mandate by providing a more accurate system and method to locate mobile terminals within a telecommunications system.

It is a further object of the present invention to provide a system and method for more accurately estimating mobile terminal users implementing emergency signals, whereby emergency response teams may be more accurately guided to and assist the users.

SUMMARY OF THE INVENTION

The present invention is directed to a system and method for improving the accuracy of a location measurement within a telecommunications system. A combination of Time Difference of Arrival (TDOA) and Timing Advance (TA) location measurement techniques enables Automatic Location Identification (ALI) with minor modifications to the telecommunications system and with reduced measurement error.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
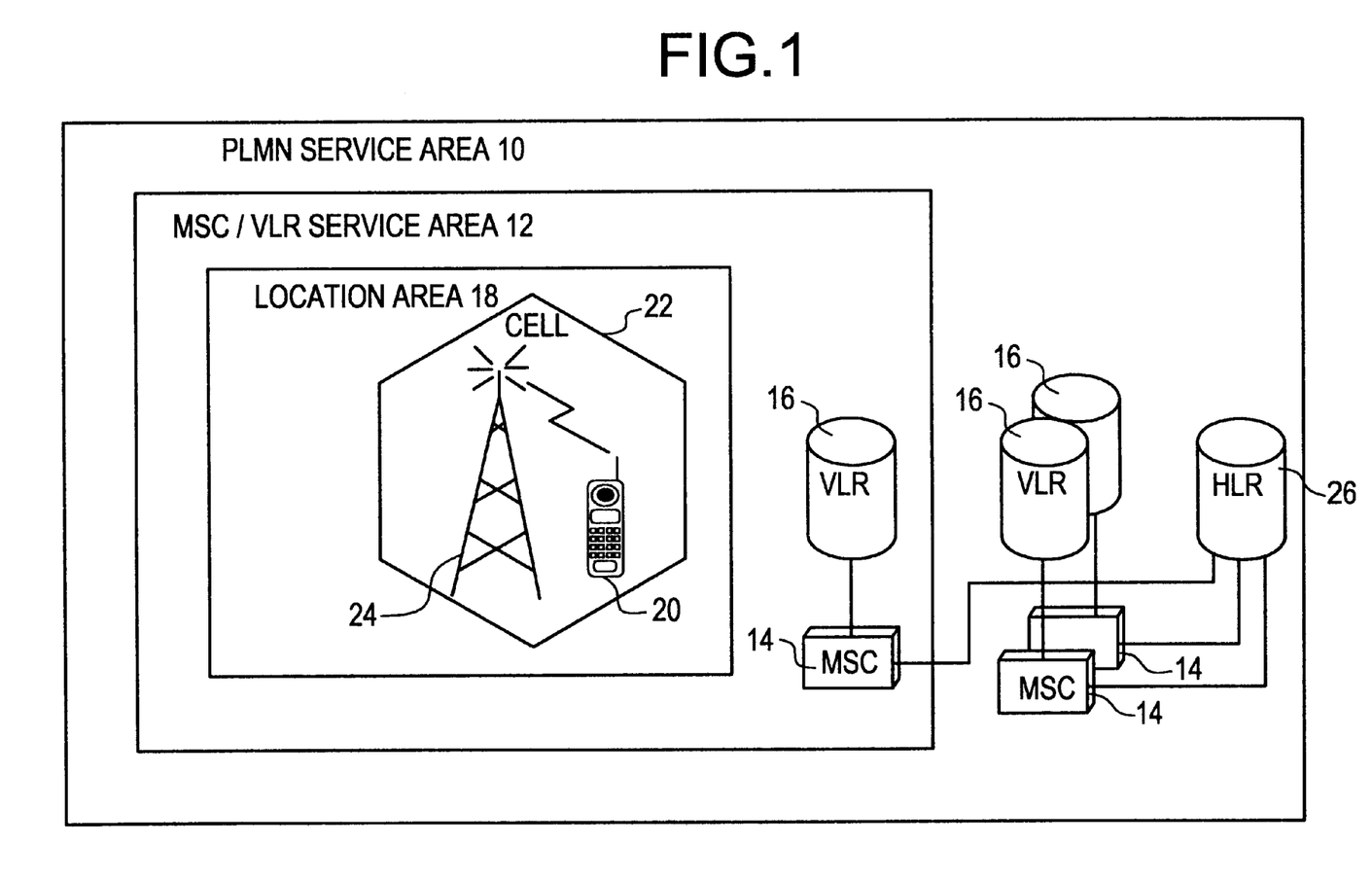
FIG. 1 is a block diagram of a telecommunications system which employs the principles of the present invention.

With reference now to FIG. 1 of the drawings, there is illustrated a Public Land Mobile Network (PLMN), such as cellular network 10, within which the hybrid mobile terminal location measurement technique of the present invention may be utilized. The network 10 is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls that LA 18. Each Location Area 12 is divided into a number of cells 22. Mobile Station (MS) 20 is the physical equipment, e.g., a car phone or other portable phone, used by mobile subscribers to communicate with the cellular network 10, each other and other wireline and wireless users outside the network 10. A Base Station (BS) 24 is the physical equipment, illustrated for simplicity as a radio tower, that provides radio coverage to the geographical area of the cell 22 in which to handle radio traffic to and from the MS 20.

With further reference to FIG. 1, the PLMN Service Area or cellular network 10 includes a Home Location Register (HLR) 26 along with the MSC/VLR 14/16. The HLR is a database maintaining all subscriber information, e.g., user profiles, current serving cell location and routing information, International Mobile Subscriber Identity (IMSI) numbers, and other administrative information. The HLR 26 may be co-located with a given MSC 14, an integral part of the MSC 14 or service multiple MSCs 14, the latter of which is illustrated in FIG. 1. The VLR 16 is a database containing information about all of the mobile stations 20 currently located within the MSC/VLR area 12.

Figure 2:
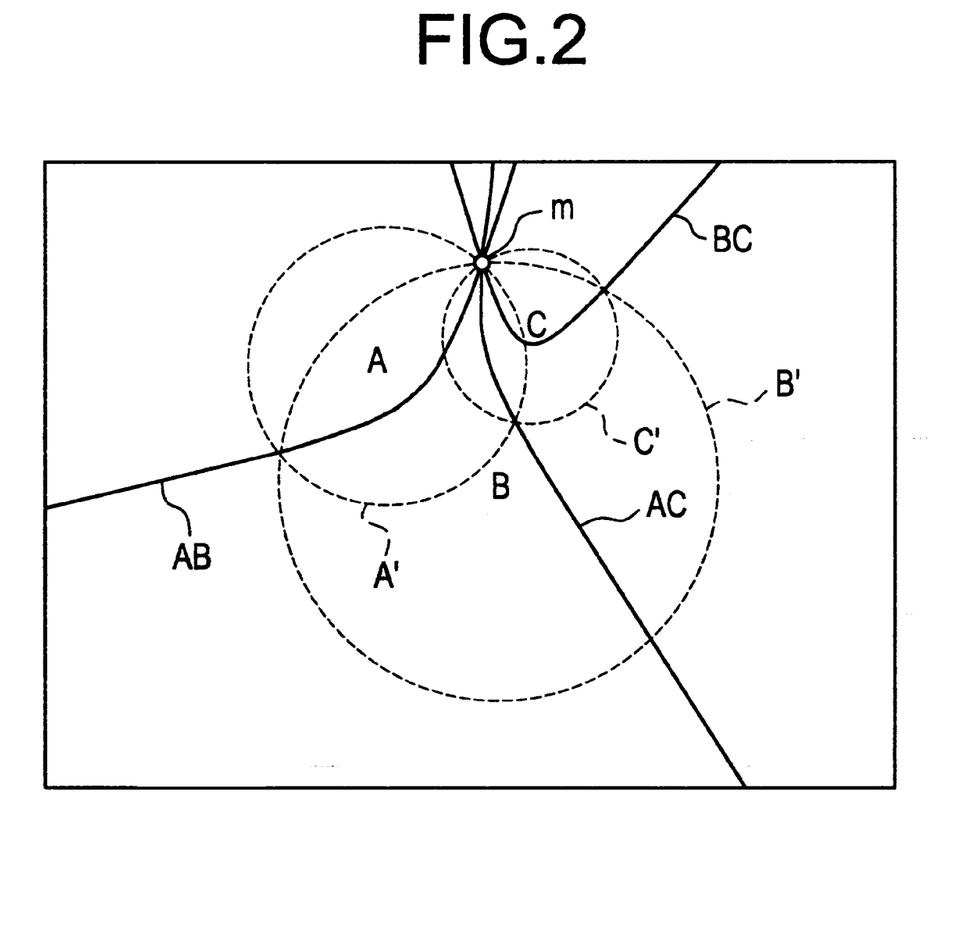
FIG. 2 is a representative diagram of a first technique for implementing the present invention with the system shown in FIG. 1, with three base stations used.

With reference now to FIG. 2, there is illustrated a first implementation of the present invention, a hybrid technique for measuring the position of a given mobile terminal, such as terminal 20, within the PLMN 10. As noted, Time Difference of Arrival (TDOA) and Timing Advance (TA) offer the greatest precision for the least cost in equipment modifications. TDOA and TA also offer independent measurements of the mobile terminals' 20 position. Hence a combination of the techniques offers a synergy of location estimation functions, as described further herein.

With reference again to FIG. 2, three base stations 24 are shown (represented] in the figure by A, B and C) and a mobile terminal 20 (represented by M) is within the purview of the aforedescribed three base stations A, B and C. In measuring the aforementioned TDOA between two base stations, e.g., A and B, of the signal from mobile terminal M, a hyperbola is formed, as is understood in the mathematical arts. For example, hyperbola AB represents the line of potential locations for the mobile terminal M with reference to both base stations A and B so that the difference in distance (time) between the two base stations at each point along the hyperbola AB is a constant. In this manner, hyperbolas AC and BC are also formed about the base stations 24.

As shown in FIG. 2, in the idealized absence of measurement error all three hyperbolae, i.e., hyperbolae AB, AC and BC, intersect at the location of the mobile terminal M. In the real-world presence of measurement error, however, there will be an error in the determination of the intersection point.

Dashed circles A', B' and C', representing the TA distances from the respective base stations A, B and C, are also shown. As with the aforementioned hyperbolae, the three circles also intersect at the locus of the mobile terminal M, illustrating the convergence of the two techniques in this scenario. It should nonetheless be understood that the TA circles will contain measurement errors just as the hyperbolae do. The combination of independent and complementary TA and TDOA data, however, offers a more accurate technique for mobile terminal location measurement. It should also be understood that an optimum estimate of location of the mobile terminal M should be determined by least-squares or other statistical techniques. The resultant errors will be less than either TDOA and TA alone could offer.

Figure 3:
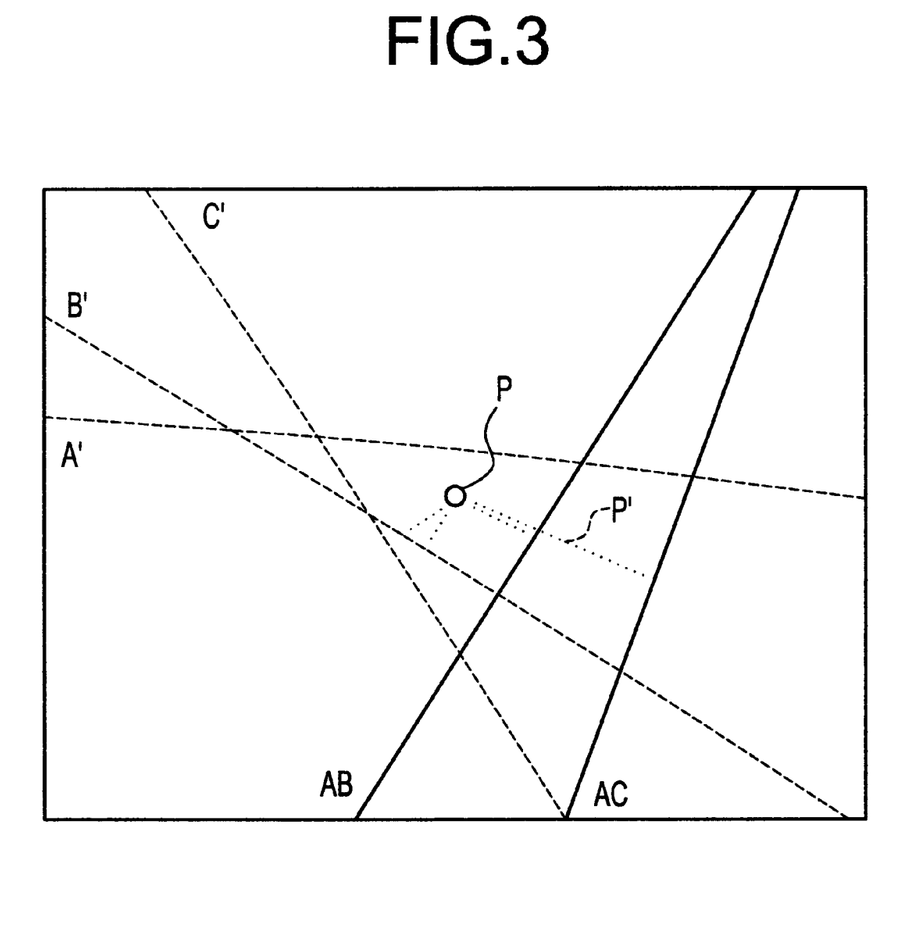
FIG. 3 is a representative diagram of a least-squared measurement technique used in localizing a mobile terminal within the system shown in FIG. 1 and implementation shown in FIG. 2.

Shown in FIG. 3 is an example of an implementation of a least-squares optimization technique for location measurement in accordance with the present invention. As is understood in the mathematical arts, a least-squares approximation measures the sum of the squares of the distances from a given point P to each curve and selects that location exhibiting the least of the sum of squared values.

It should be understood that the standard deviation of each of the aforementioned curves in FIG. 3 is defined as that distance on either side of the curve within which the true location lies with approximately 67% probability, as is understood in the statistical arts. In general, the standard deviation will vary from curve to curve and even from one location to another on the same curve, and may be calculated from the known errors in the TDOA and TA measurements. Distances are then measured in terms of the number of standard deviations, with proper attention to any correlations between the measurements, as is understood in the art. Under standard assumptions, however, e.g., that the measurement errors are Gaussian and unbiased, the optimum point P is given by the point at which the sum of the squared distances is a minimum.

FIG. 3 illustrates a highly magnified view of the afore-described region of closest convergence between the curves of the TDOA and TA techniques using three base stations 24, as illustrated in FIG. 2. Particularly, hyperbolas AB and AC are shown proceeding from the top to the bottom of FIG. 3. Since hyperbola BC is redundant (when in combination with the other two hyperbolae), only two hyperbolae, AB and AC, are utilized in the least-squared measurement.

Also shown in FIG. 3 are the three TA circles A', B' and C' which also converge near to a common point with the hyperbolae AB and AC. The aforementioned measurement errors cause this lack of perfect convergence, and the least-squared technique determines that point between the various curves shown that best approximates a point of intersection. The orthogonal or perpendicular dotted lines shown (one of which is P' illustrated in the figure) represent the shortest distance between a point P and the respective curve. For example, point P in FIG. 3 represents that point between curves AB, AC and arcs A', B' and C' with the smallest sum of squared distances.

Figure 4:
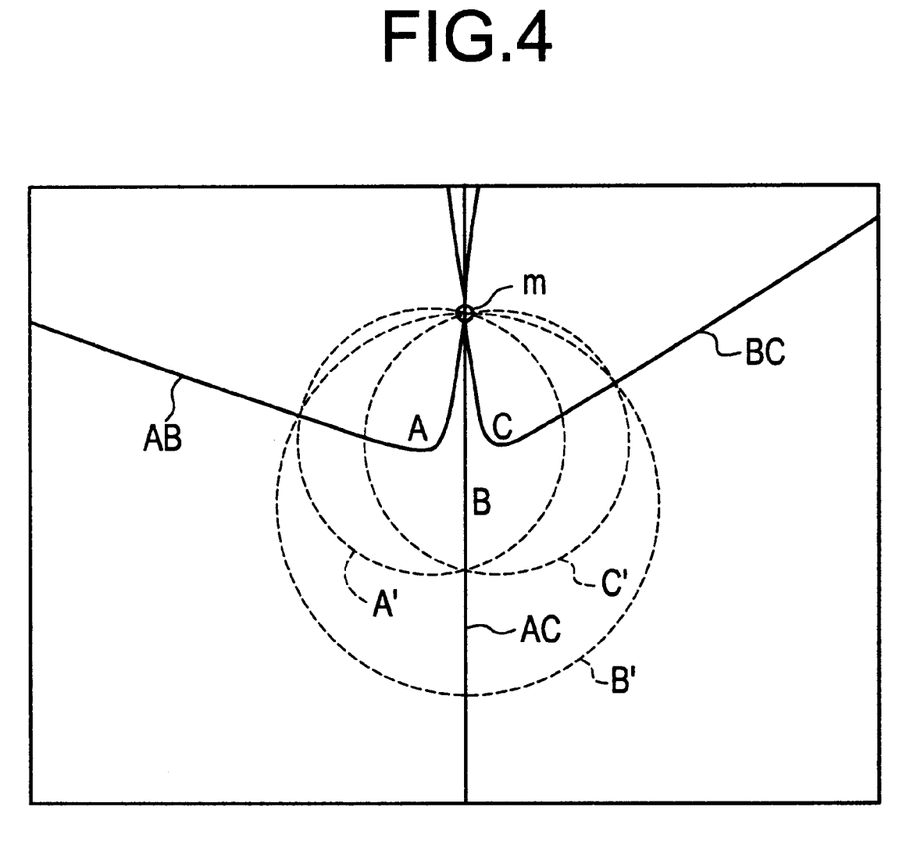
FIG. 4 is a representative diagram illustrating a first advantage of the present invention.

Whereas the mobile M in FIG. 2 is relatively close to the coverage area of the base stations A, B and C, illustrated in FIG. 4 is a scenario where the mobile M is further removed from the more central area of base station coverage. For example, the three base stations A, B and C may cover a town therebetween and the mobile terminal M may be outside of town, albeit still within range of the afore-described base stations 24. As discussed, TDOA requires data from pairs of base stations, where three base stations 24 provide three different pairs (and three different hyperbolae). However, only two of these hyperbolae provide useable information; the third is a linear combination of the data from the other two, as discussed hereinbefore, and provides no additional information. TDOA can, therefore, position the mobile M at the intersection of the hyperbolae, as shown and described in connection with FIG. 2.

As illustrated in FIG. 4, however, in the vicinity of the mobile terminal M, all three hyperbolae nearly coincide over a relatively large distance in the direction radial from the cluster of base stations A, B and C. Therefore, whereas in the first scenario TDOA determined the mobile's position reasonably well, TDOA is poor in the radial direction, outside of the cluster of base stations 24 as in FIG. 4. With a consequent high degree of potential error inherent in the location determination, the intersection point (or mobile M's location) could lie within a large area, making rescue efforts difficult. In this scenario, therefore, the integration of TA techniques provides the requisite degree of accuracy.

As shown in FIG. 4, TA, complementary to TDOA, performs very well in the radial direction. In particular, in the vicinity of the mobile M, the TA circles A', B' and C' do not diverge very rapidly transverse to the radial direction and, therefore, provide relatively poor precision in that direction, but do provide three independent measurements of the radial distance. Accordingly, only by using the two techniques in conjunction does one achieve good precision in all directions. This is important because the service area in the doughnut-shaped coverage area surrounding the constellation of base stations, such as A, B and C, inside a city may be considerably larger than the coverage area of the city itself.

Figure 5:
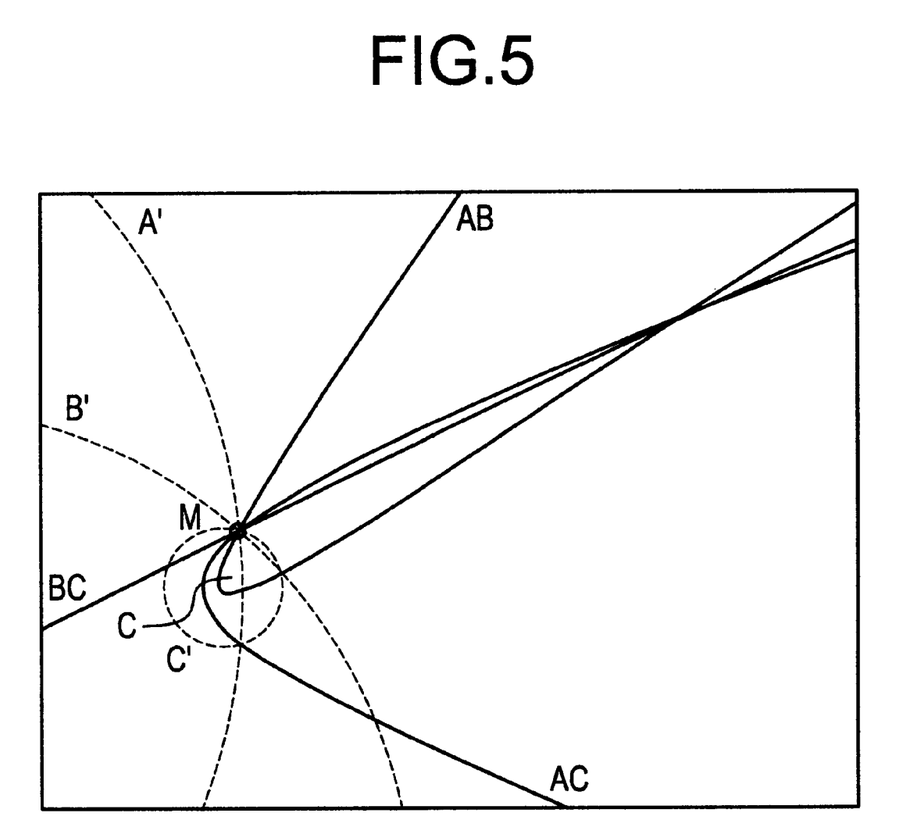
FIG. 5 is a representative diagram illustrating a second advantage of the present invention.

Furthermore, the combination of TA and TDOA allows resolution of common ambiguities suffered by either technique separately. For example, in FIG. 5 a situation involving three base stations 24 (A, B and C as described, the latter being visible in the figure) is represented along with the resultant two hyperbolas AB and AC (and redundant hyperbola BC) for a TDOA position determination of the mobile M. FIG. 5 is a magnified view of the mobile terminal M location showing the nearby base stations and the nearby portions at the curves. It should be understood that, in this case, using TDOA alone, there are two possible solutions, where the hyperbolae cross. The addition of the TA circles (dashed curves) will allow the ambiguous solutions, which lie at different TA from all three base stations, to be clearly resolved without the need for additional base station 24 measurements.

Figure 6:
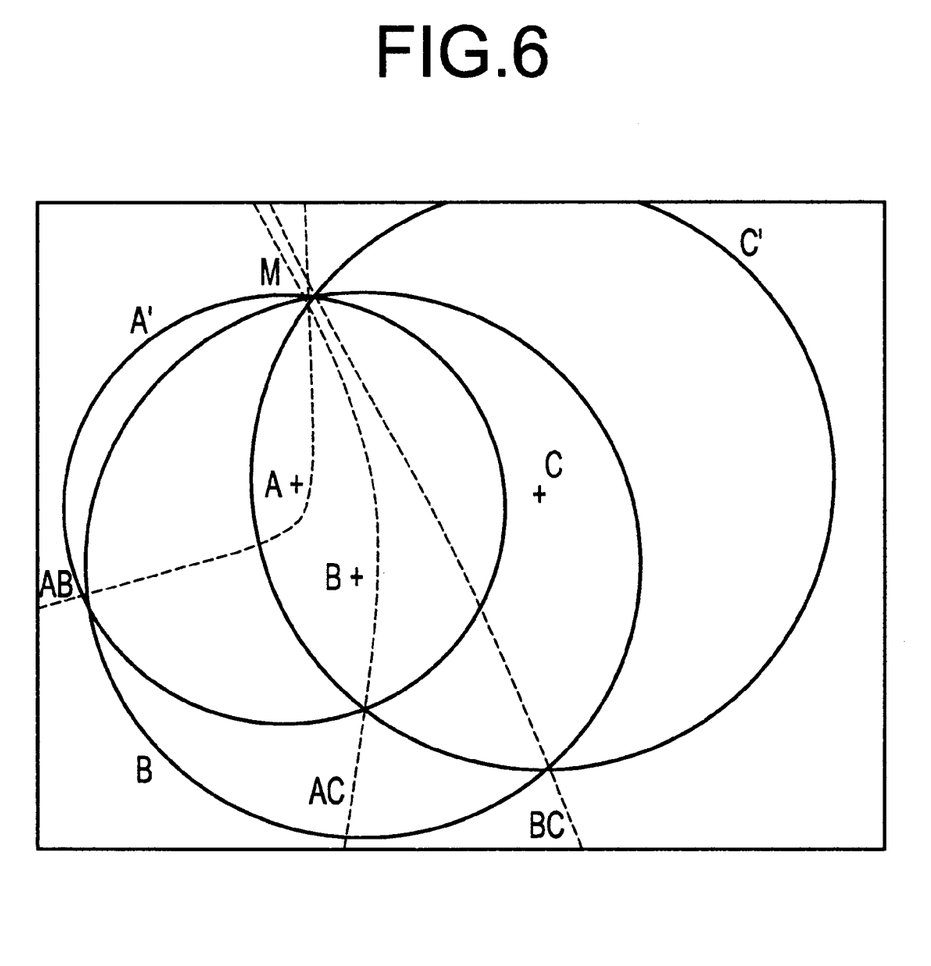
FIG. 6 is a representative diagram illustrating a third advantage of the present invention.

In FIG. 6 there is illustrated the case of three base stations and TA position determination only. Although, with perfect measurements (shown), there is a unique solution where all three circles A', B' and C' cross, it is apparent that there are other nearby points where two of the circles cross and the third is nearby. In the presence of measurement error, it may not always be possible to resolve these scenarios satisfactorily. TDOA hyperbolae (dashed), however, provide the extra information to resolve such ambiguities in nearly all such cases without the necessity of adding new base stations 24.

Figure 7:
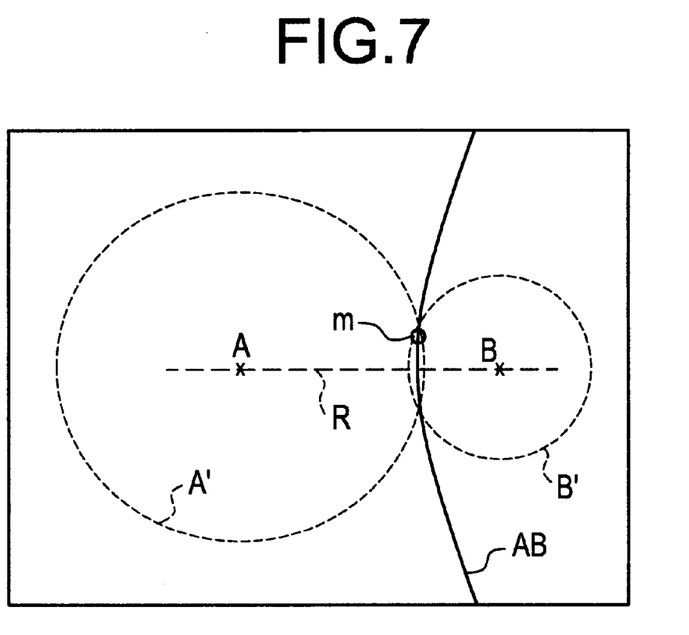
FIG. 7 represents a second technique for implementing the principles of the present invention with the system shown in FIG. 1, with two base stations used.

The combinatory techniques of the present invention are further applicable in situations where only two base stations 24 are within range, albeit with reduced precision. For example, in rural areas, base stations 24 may be positioned along a stretch of highway, as are base stations A and B shown in FIG. 7. In this scenario the mobile terminal M is off axis, i.e., off the line (R) connecting base stations A and B, along which a highway may run. The hyperbola AB and circles A' and B' in this scenario, instead of pinpointing a unique position identify two potential locations for the mobile terminal M where the curves cross, one above and one below the connecting line R where the highway most likely lies. Accordingly, some ambiguity is present in this scenario, despite the combination of TDOA and TA techniques. Nonetheless, even though the system and method of the present invention in this scenario are less precise, the options remaining are resolvable. For example, the ambiguity in position relative to the highway may be resolved from conversation with the mobile terminal M user. Accordingly, even in situations with limited information, the hybrid TDOA and TA technique of the present invention focuses the analysis to a reduced number of areas, providing an enhanced measure of accuracy, e.g., in rural or desolate areas.

Figure 8:
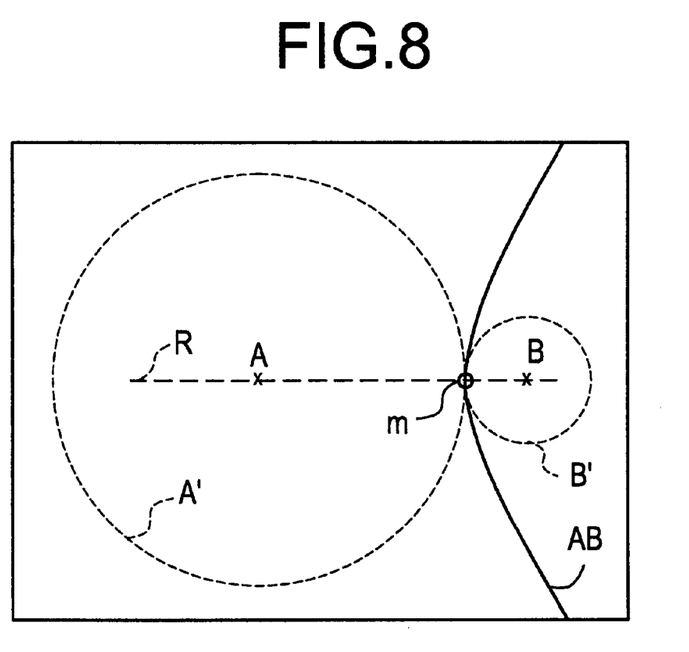
FIG. 8 represents a variation of the technique shown in FIG. 7.

In a variant of the above scenario, the mobile terminal M is on the highway (radial line R) between the two base stations A and B, as shown in FIG. 8. Here, however, the positional ambiguity is resolved because the two solutions obtained by the combined technique are degenerate, i.e., they specify the same location. Accordingly, it is noted that precision in this more limited two base station 24 scenario is greater parallel to the highway than transverse to it (FIG. 8). Since the user is most likely on or near the highway, the transverse location of the highway itself may provide the necessary precision in that direction and therefore the resolution may be acceptable.

It should, nonetheless, be understood that although the subject matter of the present invention includes some positional ambiguity in the two base station scenario, the overall errors introduced by using the synergistic combination of the two techniques are reduced in size compared with the error using TA or TDOA alone.

It should also be understood that although the aforementioned scenarios of use for the system and method of the present invention illustrate two-dimensional or planar surface precision locating, the principles set forth in the present invention are also applicable in locating mobile terminals 20 in the vertical direction, e.g., within a high-rise, as well. Although such three-dimensional positioning is possible, it should, nonetheless, be understood that vertical positional errors tend to be larger than those of horizontal position determination because the base stations 24 will tend to lie in a common, substantially horizontal plane. The hybrid approach of the present invention is in any event an improvement over either technique taken separately because of the additional information from the combination.

It should additionally be understood that the algorithms for the aforedescribed TDOA and TA techniques may be stored within the MSC 14 or other central processing center or node within the system 10, as is understood in the art, whereby the two techniques are combined or melded into the aforementioned improved hybrid technique. In particular, at least two base stations 24 forward the information pertaining to the TDOA and TA measurements of the MS 20 to the MSC 14 across wireline links (not shown) thereto for processing.

It should further be understood that the principles of the present invention may be utilized in a number of contexts. As noted, this location technique may be incorporated into an enhanced 911 service to enable Pubic Service Answering Points (PSAP) to locate the scene of an emergency requiring dispatch of units for assistance. Additional uses include fraud perpetrators, location of cellular calls being made during the commission of a crime or by perpetrators following a crime, location-sensitive billing, vehicle and fleet management, inventory/package monitoring and any other application where improved location precision provides a benefit.

Figure 9:
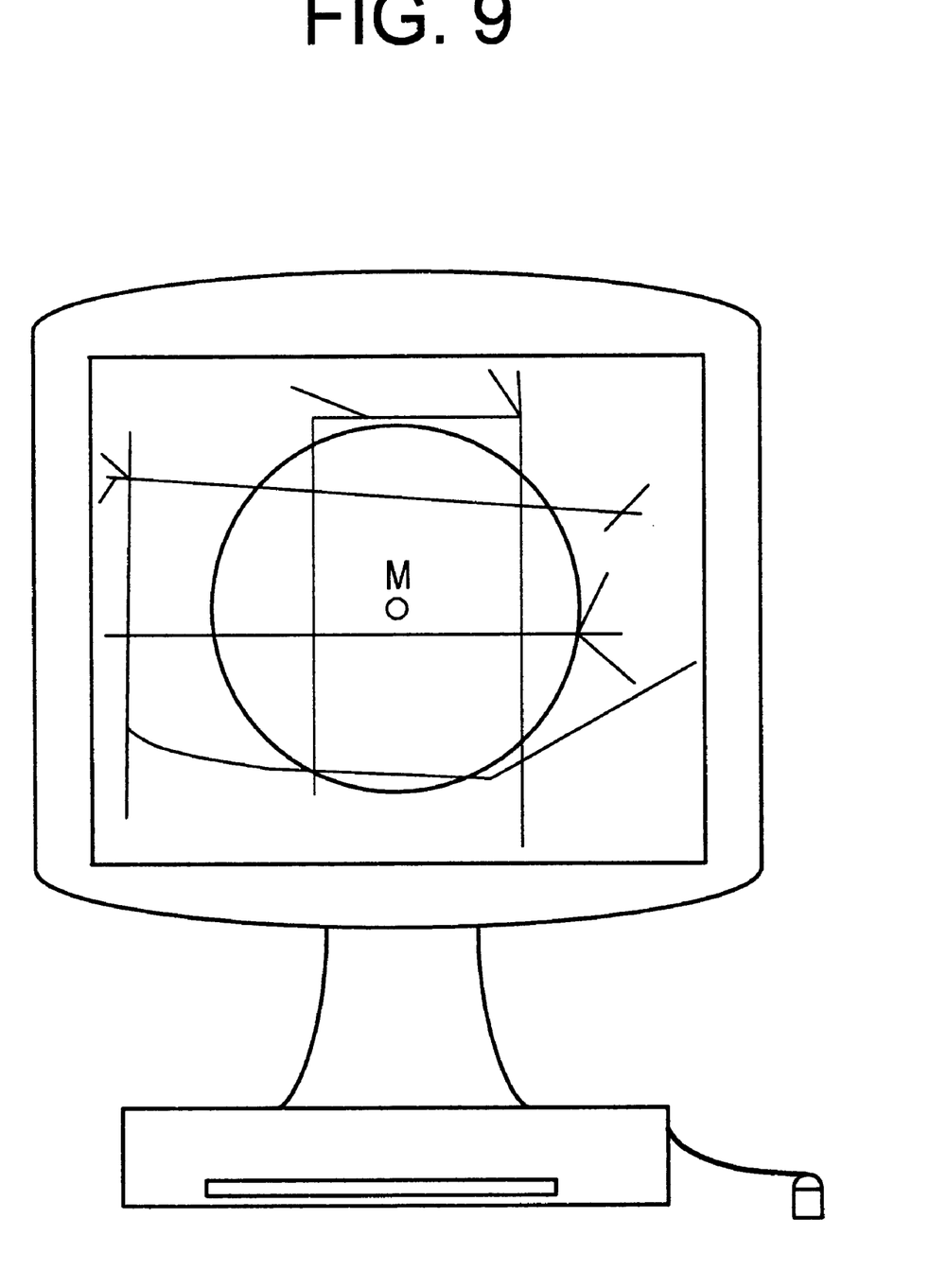
FIG. 9 illustrates a display device connected to a component of FIG. 1 for displaying the hybrid technique of the present invention.

The PSAP or other agency using the position information will be able to display the estimated location and its error on a monitor containing a detailed map of the area, as shown in FIG. 9. The central location and its estimation error are both determined by the least-squares procedure mentioned above. In general, the error will be elliptical in shape; in some simpler implementations a circle may be displayed instead, as illustrated in FIG. 9. In use by a PSAP for example, the dispatcher would first send responding units to the center. Then if the phone caller is not visible due to estimation error, the units will have to search the entire region inside the circle or ellipse. Therefore it may in some cases be a matter of life of death to reduce the size of this search area to the minimum possible within applicable cost constraints.

Further details on an elliptical search restriction technique are described in applicants' co-pending patent application, U.S. Ser. No. 08/903,551, entitled "System and Method Using Elliptical Search Area Coverage in Determining the Location of a Mobile Terminal", filed Jul. 30, 1997, and incorporated by reference herein.

It should additionally be understood that although under current technology a mobile terminal 20 may monitor up to about seven distinct base stations 24 (one of which is the serving base station 24 for that mobile terminal 20), future technologies may permit a given mobile terminal 20 to monitor greater numbers (n) of base stations 24 and, therefore, greater numbers (n−1) of hyperbolae therebetween to be considered.

It should also be understood that the scope of the present invention encompasses the aforedescribed hybrid locating technique, particularly, a hybrid technique employing both TDOA and TA measurements to pinpoint and verify the transmission location of the mobile terminal. The results are then displayed within a particular degree of error to rescue workers or others desiring the mobile terminal's location.

The previous description is of a preferred embodiment for implementing the invention, and the scope of the invention should not necessarily be limited by this description. The scope of the present invention is instead defined by the following claims.

What is claimed is:

1. A method for determining a position of a mobile terminal communicating within a radiocommunication system, said method comprising the steps of:

receiving, at a multiplicity of base stations, a signal transmitted by said mobile terminal;

forwarding, by each of said multiplicity of base stations, said received signal and timing information to a central processing center;

calculating, within said central processing center, a time difference of arrival (TDOA) location estimate of said mobile terminal based upon said timing information;

calculating, within said central processing center, a timing advance (TA) location estimate of said mobile terminal based upon said timing information; and determining said position of said mobile terminal using said TDOA and TA location estimates.

2. The method according to claim 1, further comprising the step of:

displaying said position of said mobile terminal.

3. The method according to claim 1, wherein said central processing center calculation of said TDOA location estimate comprises computing a hyperbola between a first and a second of said multiplicity of base stations.

4. The method according to claim 3, wherein said central processing center calculation of said TDOA location estimate comprises computing n hyperbolae between n+1 of said base stations, wherein n ranges from 3 to 7.

5. The method according to claim 1, said central processing center calculation of said TA location estimate comprises computing respective timing advance circles about a first and a second of said multiplicity of base stations.

6. The method according to claim 5, said central processing center calculation of said TA location estimate further comprises computing n timing advance circles about n of said base stations, wherein n ranges from 3 to 7.

7. The method according to claim 1, wherein said step of determining said position comprises a least-squares approximation of said position using said TDOA and TA location estimates.

8. In a telecommunications system employing a multiplicity of base stations, at least one mobile terminal in wireless communication with at least two of said base stations, circuitry within a central processing center of said telecommunications system for locating said at least one mobile terminal therein, said circuitry comprising:

a first locating means for locating said at least one mobile terminal, said first locating means employing time difference of arrival algorithms;

a second locating means for locating said at least one mobile terminal, said second locating means employing timing advance algorithms; and combinatory means for combining said first locating means and said second locating means and estimating the location of said at least one mobile terminal from both said first and second locating means.

9. The telecommunications system according to claim 8, further comprising:

display means for displaying the combination of first and second locating means, said first and second locating means being overlaid upon said display means.

10. The telecommunications system according to claim 9, wherein said display means is located at a display terminal in communication with said central processing center of said telecommunications system.

11. The telecommunications system according to claim 9, wherein said display means displays the location of said at least one mobile terminal along a substantially planar surface.

12. The telecommunications system according to claim 11, wherein said display means displays the location of said at least one mobile terminal substantially in three dimensions.

13. The telecommunications system according to claim 8, wherein said time difference of arrival algorithms of said first locating means form a hyperbola between a first and a second of said base stations, said combinatory means estimating said at least one mobile terminal location from said hyperbola.

14. The telecommunications system according to claim 13, wherein said combinatory means estimates said at least one mobile terminal location from two said hyperbolas.

15. The telecommunications system according to claim 13, wherein said time difference of arrival algorithms form n−1 hyperbolae between n of said base stations, wherein n ranges from 3 to 7, said combinatory means estimating said at least one mobile terminal location from said n hyperbolae.

16. The telecommunications system according to claim 8, wherein said timing advance algorithms of said second locating means form respective timing advance circles about a first and a second of said base stations, said combinatory means estimating said at least one mobile terminal location from said timing advance circles.

17. The telecommunications system according to claim 15, wherein said timing advance algorithms form n timing advance circles about n of said base stations, wherein n ranges from 3 to 7, said combinatory means estimating said at least one mobile terminal location from said respective n timing advance circles.

18. The telecommunications system according to claim 8, wherein said central processing center of said telecommunications system comprises a mobile services center, said at least two base stations in communication with said at least one mobile terminal and with said mobile services center, said combinatory means located within said mobile services center.

19. In a telecommunications system employing a mobile services center and at least two base stations in communication with at least one mobile terminal and said mobile services center, circuitry within said mobile services center for locating said at least one mobile terminal within said telecommunications system, said circuitry comprising:

a first locating means for locating said at least one mobile terminal, said first locating means employing time difference of arrival algorithms;

a second locating means for locating said at least one mobile terminal, said second locating means employing timing advance algorithms; and combinatory means for combining said first locating means and said second locating means and estimating the location of said at least one mobile terminal from both said first and second locating means.

20. The telecommunications system according to claim 19, further comprising:

a display means for displaying the combination of first and second locating means, said first and second locating means being overlaid upon said display means.

* * * * *

UNITED STATES PATENT AND TRADEMARK OFFICE
CERTIFICATE OF CORRECTION

PATENT NO. : 5,987,329  
DATED : November 16, 1999  
INVENTOR(S) : Yost et al.

Page 1 of 1

It is certified that error appears in the above-identified patent and that said Letters Patent is hereby corrected as shown below:

Column 1,
Line 4, after "TECHNIQUE" insert --
BACKGROUND OF THE PRESENT INVENTION
Field of the invention
The present invention is directed to a system and method for improved mobile telephone location, particularly, to a system and method employing a hybrid location measuring technique for determining the location of a mobile telephone within a telecommunications system. --

Signed and Sealed this

Nineteenth Day of February, 2002

Attest:

Attesting Officer

JAMES E. ROGAN
Director of the United States Patent and Trademark Office